United States Patent
Diephuis et al.

(10) Patent No.: US 11,975,647 B2
(45) Date of Patent: May 7, 2024

(54) VEHICLE INCLUDING LIFT ASSEMBLY

(71) Applicant: Ford Global Technologies, LLC, Dearborn, MI (US)

(72) Inventors: Jesse Rene Diephuis, West Bloomfield, MI (US); Michael John Harmon, Northville, MI (US); Hussain Tajmahal, Detroit, MI (US); Amol Borkar, Nagpur (IN)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 17/673,954

(22) Filed: Feb. 17, 2022

(65) Prior Publication Data
US 2023/0256885 A1    Aug. 17, 2023

(51) Int. Cl.
| | |
|---|---|
| B60P 1/44 | (2006.01) |
| B60P 1/00 | (2006.01) |
| B62D 33/027 | (2006.01) |
| B62D 33/03 | (2006.01) |

(52) U.S. Cl.
CPC ............. *B60P 1/4471* (2013.01); *B60P 1/003* (2013.01); *B60P 1/4421* (2013.01); *B60P 1/4435* (2013.01); *B60P 1/4485* (2013.01); *B62D 33/0273* (2013.01); *B62D 33/03* (2013.01)

(58) Field of Classification Search
CPC ........... B60P 1/003; B60P 1/44; B60P 1/4407; B60P 1/4414; B60P 1/4421; B60P 1/4428; B60P 1/4435; B60P 1/4442; B60P 1/445; B60P 1/4457; B60P 1/4464; B60P 1/4471; B60P 1/4478; B60P 1/4485; B60P 1/4492
USPC ........ 414/347, 349, 389, 402, 541, 544, 545
See application file for complete search history.

(56) References Cited

U.S. PATENT DOCUMENTS

| | | | | |
|---|---|---|---|---|
| 1,231,380 A | * | 6/1917 | Kissane et al. ........ | B60P 1/4421 414/673 |
| 3,024,926 A | * | 3/1962 | Nolden .................. | B60P 1/4421 414/545 |
| 3,028,130 A | * | 4/1962 | Burton ..................... | B64D 9/00 244/137.1 |
| 3,371,805 A | * | 3/1968 | Himes ................... | B60P 1/4421 414/545 |
| 3,666,127 A | * | 5/1972 | Guyaux ................ | B66F 7/0658 14/71.1 |
| 3,887,092 A | * | 6/1975 | Leet ...................... | B60P 1/4421 414/545 |
| 4,813,842 A | * | 3/1989 | Morton ................... | A01D 90/00 296/57.1 |

(Continued)

FOREIGN PATENT DOCUMENTS

| | | |
|---|---|---|
| CN | 206856559 U | 1/2018 |
| GB | 687340 A | 2/1953 |

(Continued)

*Primary Examiner* — James Keenan
(74) *Attorney, Agent, or Firm* — Vichit Chea; Carlson, Gaskey & Olds, P.C.

(57) ABSTRACT

This disclosure relates to a motor vehicle including a lift assembly. In some aspects, the techniques described herein relate to a motor vehicle, including a panel and an actuator assembly configured to raise and lower the panel between a highest position and a lowest position. When the panel is in the lowest position, an underside of the panel is spaced-apart above a ground surface.

12 Claims, 4 Drawing Sheets

(56) References Cited

U.S. PATENT DOCUMENTS

| | | | |
|---|---|---|---|
| 5,378,105 A * | 1/1995 | Palko | B60P 1/44 |
| | | | 410/67 |
| 5,791,860 A | 8/1998 | Stockmann | |
| 6,357,986 B1 * | 3/2002 | Sonnamaker | B66F 7/02 |
| | | | 414/400 |
| 6,976,820 B2 | 12/2005 | Sandy | |
| 7,073,837 B2 * | 7/2006 | Madlinger | B62D 33/03 |
| | | | 296/57.1 |
| 10,081,303 B1 * | 9/2018 | Ngo | B60R 3/00 |
| 10,358,074 B2 | 7/2019 | Leurck et al. | |
| 11,724,897 B2 * | 8/2023 | Galin | B60P 3/06 |
| | | | 414/812 |
| 2016/0129825 A1 * | 5/2016 | Parker | B60P 1/4414 |
| | | | 414/346 |
| 2017/0202715 A1 * | 7/2017 | Carletti | B60P 1/4471 |
| 2022/0194627 A1 * | 6/2022 | Morikami | B60P 1/6436 |

FOREIGN PATENT DOCUMENTS

| | | | | |
|---|---|---|---|---|
| JP | 60148729 A | * | 8/1985 | B60P 1/4421 |
| KR | 20160031971 A | * | 3/2016 | B60P 1/44 |

* cited by examiner

VEHICLE INCLUDING LIFT ASSEMBLY

TECHNICAL FIELD

This disclosure relates to a motor vehicle including a lift assembly.

BACKGROUND

Some vehicles, such as pickup trucks, include a cargo bed. The cargo bed can be located behind a passenger compartment of the vehicle. A tailgate can enclose a rear, or aft, end of the cargo bed. Users use cargo beds to carry various types of loads and/or cargo.

SUMMARY

In some aspects, the techniques described herein relate to a motor vehicle, including: a panel; and an actuator assembly configured to raise and lower the panel between a highest position and a lowest position, wherein, when the panel is in the lowest position, an underside of the panel is spaced-apart above a ground surface.

In some aspects, the techniques described herein relate to a motor vehicle, further including: a first sensor configured to generate signals indicative of a position of the panel relative to a ground surface; and a controller configured to interpret the signals from the first sensor, and wherein the controller is configured to command the actuator assembly to prevent the panel from being lowered into a position in which the panel would directly contact the ground surface.

In some aspects, the techniques described herein relate to a motor vehicle, further including: a second sensor configured to generate signals indicative of a position of a cart adjacent the motor vehicle, wherein the controller is configured to interpret the signals from the second sensor to identify an upper surface of the cart, and wherein the controller is configured to command the actuator assembly to lower the panel into a loading position in which an upper surface of the panel is parallel with the upper surface of the cart.

In some aspects, the techniques described herein relate to a motor vehicle, wherein, if movement of the panel into the loading position would cause the underside of the panel to directly contact the ground surface, the controller is configured to command the actuator assembly to move the panel to another position in which the panel is adjacent the loading position but the underside of the panel does not directly contact the ground surface.

In some aspects, the techniques described herein relate to a motor vehicle, wherein the panel includes the first and second sensors.

In some aspects, the techniques described herein relate to a motor vehicle, wherein the panel is a tailgate.

In some aspects, the techniques described herein relate to a motor vehicle, wherein, when the panel is in the highest position, an upper surface of the panel is substantially parallel with a floor of a cargo area of the motor vehicle.

In some aspects, the techniques described herein relate to a motor vehicle, wherein: wherein the panel is a tailgate rotatable about an axis between an open position and a closed position relative to a cargo area, the tailgate is slidable between a standard position and an extended position in a direction parallel to a centerline axis of the motor vehicle, and the tailgate is only moveable between the highest and lowest positions when the tailgate is in the open position and in the extended position.

In some aspects, the techniques described herein relate to a motor vehicle, wherein the panel is a tailgate rotatable about an axis between an open position and a closed position relative to a cargo area, and further including: a cable, wherein an end of the cable is fixedly connected to the tailgate adjacent a top of the tailgate; and a telescopic assembly connected to the tailgate adjacent the axis.

In some aspects, the techniques described herein relate to a motor vehicle, further including: a pulley adjacent a top of the telescopic assembly, wherein the pulley guides the cable.

In some aspects, the techniques described herein relate to a motor vehicle, wherein: a portion of the telescopic assembly is moveable with the tailgate while the tailgate moves between the highest and lowest positions, and the pulley is configured to maintain a constant vertical position while the tailgate moves between the highest and lowest positions.

In some aspects, the techniques described herein relate to a motor vehicle, wherein a motorized reel is configured to selectively reel the cable in and out to raise and lower the tailgate, respectively.

In some aspects, the techniques described herein relate to a motor vehicle, wherein the motor vehicle is a pickup truck.

In some aspects, the techniques described herein relate to a lift assembly for a motor vehicle, including: a panel; and an actuator assembly configured to raise and lower the panel between a highest position and a lowest position, wherein, when the panel is in the lowest position, an underside of the panel is spaced-apart above a ground surface.

In some aspects, the techniques described herein relate to a lift assembly, further including: a sensor configured to generate signals indicative of a position of a cart supporting a load adjacent the motor vehicle; and a controller configure to interpret the signals from the sensor to identify an upper surface of the cart, wherein the controller is configured to command the actuator assembly to lower the panel into a position in which an upper surface of the panel is parallel with the upper surface of the cart, and wherein, if movement of the panel into the position would cause the underside of the panel to directly contact the ground surface, the controller prevent movement to the position.

In some aspects, the techniques described herein relate to a lift assembly, wherein the panel is a tailgate and the motor vehicle is a pickup truck.

In some aspects, the techniques described herein relate to a lift assembly, wherein the tailgate is rotatable about an axis between an open position and a closed position relative to a cargo area.

In some aspects, the techniques described herein relate to a lift assembly, further including: a cable, wherein an end of the cable is fixedly connected to the panel adjacent a top of the panel; a telescopic assembly connected to the panel; a pulley adjacent a top of the telescopic assembly, wherein the pulley guides the cable; and a motorized reel configured to selectively reel the cable in and out to raise and lower the panel, respectively; wherein a portion of the telescopic assembly is moveable with the panel while the panel moves between the highest and lowest positions, and the pulley is configured to maintain a constant vertical position while the panel moves between the highest and lowest positions.

In some aspects, the techniques described herein relate to a method, including: lowering a panel of a motor vehicle to a position in which an upper surface of the panel is substantially parallel to an upper surface of a cart adjacent the motor vehicle, wherein, when the panel is lowered to the position, a underside of the panel is not in direct contact with a ground surface.

In some aspects, the techniques described herein relate to a method, further including: transferring a load from the cart to the panel; and raising the panel and the load until the upper surface of the panel is substantially parallel to a floor of a cargo area of the motor vehicle.

DETAILED DESCRIPTION

This disclosure relates to a motor vehicle including a lift assembly. Among other benefits, this disclosure increases the ease of loading and unloading a cargo bed of a vehicle. Additional benefits will be appreciated from the below description.

Figure 1:
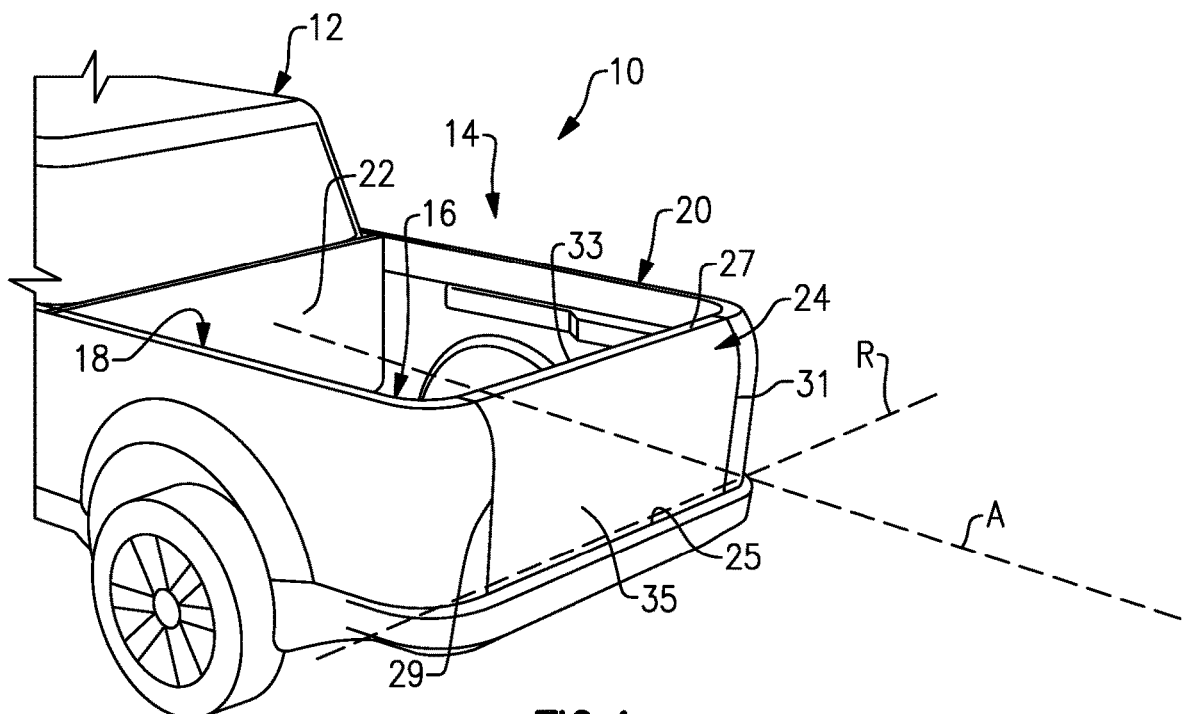
FIG. 1 is a rear-perspective view of a portion of a motor vehicle, which in this example is a pickup truck.

FIG. 1 illustrates a portion of a motor vehicle 10 ("vehicle 10"), which in this example is a pickup truck. While beneficial in the context of pickup trucks, this disclosure could extend to other vehicles besides pickup trucks, such as sport utility vehicles (SUVs), cars, vans, etc. The vehicle 10 can have either a unibody architecture or a body-on-frame architecture, as examples. The vehicle 10 can be an electrified vehicle such as a battery electric vehicle (BEV), plug-in hybrid electric vehicle (PHEV). Alternatively, the vehicle 10 could be a conventional vehicle powered solely or primarily by an internal combustion engine.

The vehicle 10 includes a passenger cabin 12 and, rearward of the passenger cabin 12, a cargo bed 14. The cargo bed 14 is an open-topped cargo area in this example. In other examples, the cargo bed 14 can be closed by a moveable cover, such as a tonneau cover, or a fixed cover, such as a truck cap.

The cargo bed 14 includes bottom surface, or floor 16, a first side 18 extending along a first side of the floor 16, a second side 20 extending along a second side of the floor 16 opposite the first side, a front wall 22, and a tailgate 24. In FIG. 1, the tailgate 24 is in a closed position. When in the closed position, the tailgate 24 encloses the cargo bed 14 from the rear. In the open position, the tailgate 24 is rotated about 90° about a rotational axis R which is substantially perpendicular to a centerline axis A of the vehicle 10, and is configured such that a user may access to the cargo bed 14 from the rear.

In this disclosure, the vehicle 10 is configured with a lift assembly, which includes the tailgate 24, and is able to function such that the tailgate 24 can move to various vertical positions to assist users with loading and unloading cargo or other loads into and out of the cargo bed 14. While the tailgate 24 is mentioned herein, this disclosure extends to vehicles that are not pickup trucks and, as such, do not include tailgates. In particular, this disclosure is not limited to lifts or lift assemblies including tailgates, and extends to lifts that include other types of panels.

The tailgate 24 exhibits a height between a bottom edge 25 and a top edge 27 and a length between first and second opposed side edges 29, 31. The length of the tailgate extends in a direction perpendicular to the centerline axis A. The tailgate 24 further includes a front surface 33 facing forward, toward the interior of the cargo bed 14 in FIG. 1, and a rear surface 35 facing a rearward direction in FIG. 1. When the tailgate 24 is open, the front surface 33 provides an upper surface of the tailgate 24 and the rear surface 35 provides the underside of the tailgate 24. Thus, in this disclosure, when the tailgate 24 is open, the front surface 33 may be referred to as an upper surface and the rear surface 35 may be referred to as the underside.

Figure 2:
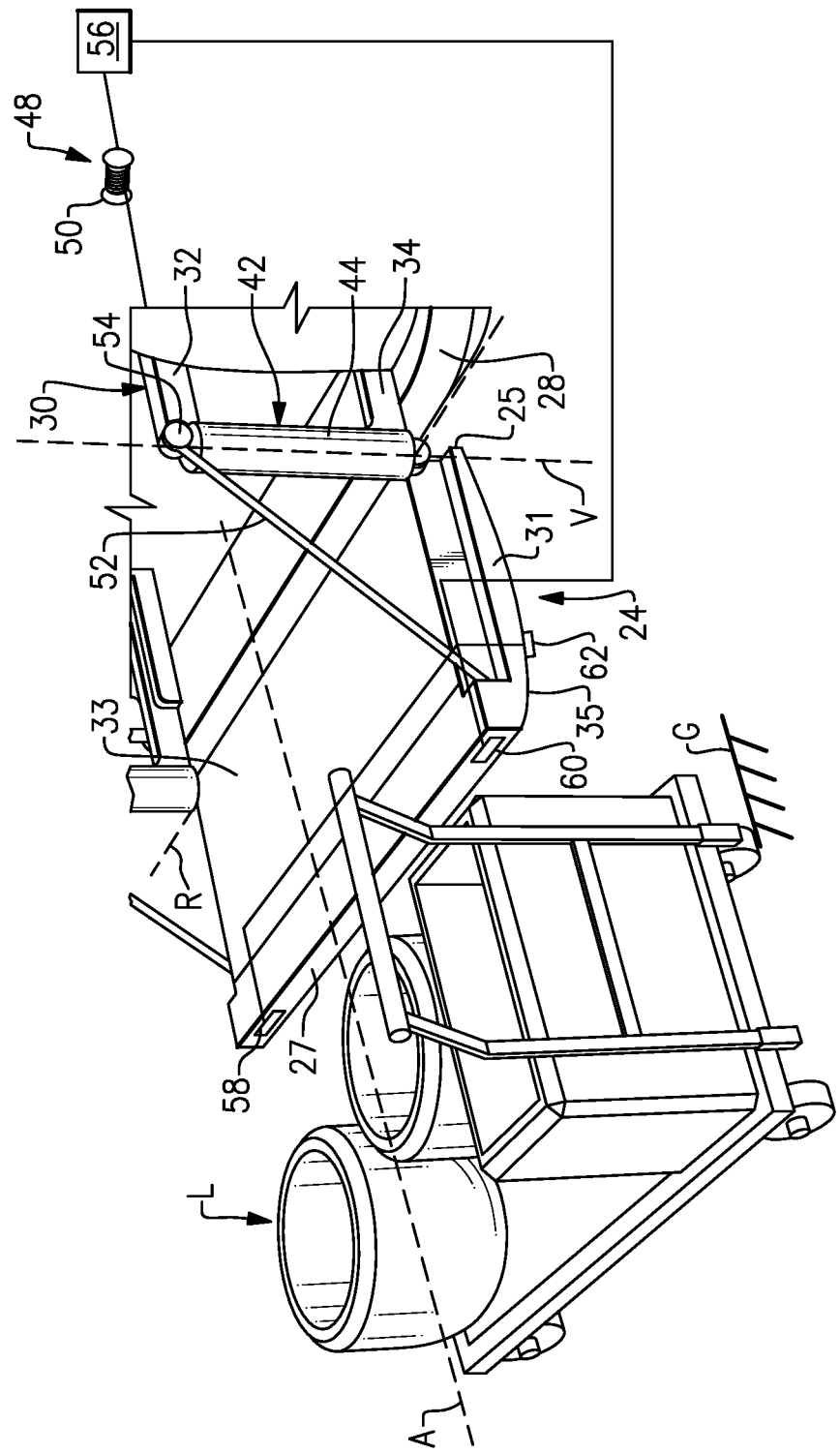
FIG. 2 is another rear-perspective view of a portion of the vehicle, and illustrates an example lift assembly.

When the tailgate 24 is open, the tailgate 24 and at least some corresponding parts of a lift assembly are slidable along the centerline axis A, in this example. In FIG. 2, the tailgate 24 is open, and has slid rearward to an extended position relative to the position of the tailgate 24 in FIG. 1. In the extended position, a bottom edge 25 of the tailgate is spaced-apart rearward of a rear bumper 28 of the vehicle 10 such that the tailgate 24 can raise and lower without contacting the rear bumper 28. If a hitch is present, the bottom edge 25 would also be spaced-apart from the hitch to avoid contact with the tailgate 24.

The tailgate 24 is slidable via a support assembly 30. One side of the support assembly 30 will be described herein. It should be understood that the support assembly 30 may include a similar arrangement of parts on an opposite side of the cargo bed 14 and tailgate 24. The support assembly 30 is slidable in a back-and-forth direction parallel to a centerline axis A of the vehicle 10 either manually or via a powered actuator.

Figure 3:
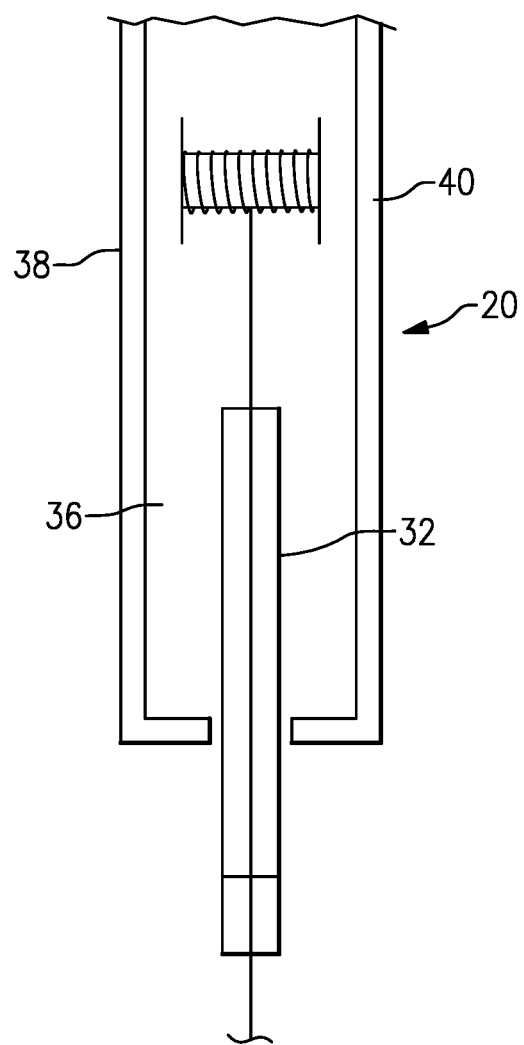
FIG. 3 illustrates, somewhat schematically, an exemplary manner in which a portion of the lift assembly can be arranged within a side of a cargo bed.

With reference to FIG. 2, the support assembly 30 includes an upper rail 32 and a lower rail 34 spaced-apart vertically from the upper rail 32. The support assembly 30 may be mounted inside the cargo bed 14. Alternatively, the support assembly 30 may be retractable at least partially into a compartment 36 between an inner surface 38 and an outer surface 40 of the second side 20 of the cargo bed 14, as shown in FIG. 3. The upper and lower rails 32, 34 may be received in guides and/or tracks configured to facilitate sliding of the tailgate 24 and the upper and lower rails 32, 34 to the extended position.

In this example, a telescopic assembly 42 vertically connects a rear end of the upper rail 32 and a rear end of the lower rail 34. The telescopic assembly 42 includes an outer housing 44, which is configured to remain vertically stationary during use, and an inner housing 46 which is configured to move vertically with the tailgate 24 by telescoping in-and-out of the outer housing 44. The outer housing 44 and inner housing 46 are arranged such that their length dimensions extend along a vertical axis V, which is substantially perpendicular to a ground surface G. The tailgate 24 is rotatably attached to a bottom of the inner housing 46, in this example.

The vehicle 10 further includes an actuator assembly 48 configured to raise and lower the tailgate 24 and a corresponding feedback circuit, including one or more sensors, configured to assist with leveling the tailgate 24 relative to a load L and/or a cart upon which the load L sits.

The actuator assembly 48 includes a motorized reel 50, or winch, drawn schematically in the drawings. The reel 50 is connected to a cable 52, which is fed around pulley 54 and fixedly connected to the tailgate 24 adjacent the top edge 27 and the second side 31. Another cable is connected to the opposite side of the tailgate 24 in a similar manner. While a reel is mentioned herein, the actuator assembly 48 extends to other types of assemblies. For example, the actuator assembly 48 could include a linear actuator incorporated into the telescopic assembly 42 as an alternative to the reel 50.

The reel 50 is configured to selectively draw in or release the cable 52 in response to instructions from a controller 56. The pulley 54 is a rotatable wheel including a grooved rim. The pulley 54 is rotatable about an axis parallel to the axis R and is mounted to the outer housing 44. As such, the pulley 54 maintains a constant vertical position and does not move vertically as the tailgate 24 raises and lowers. The reel 50 may be arranged within one of the sides of the cargo bed 14, such the compartment 36 of the second side 20, in a manner such that the reel 50 is not directly exposed to the environment, as generally shown in FIG. 3. While one reel 50 is shown, another reel could be provided on an opposite side of the tailgate 24 and work in unison with the reel 50.

The controller 56 could be part of an overall vehicle control module, such as a vehicle system controller (VSC), or could alternatively be a stand-alone controller separate from the VSC. Further, the controller 56 may be programmed with executable instructions for interfacing with and operating the various components of the vehicle 10. The controller 56 includes a processing unit and non-transitory memory for executing the various control strategies and modes of the vehicle system. Further, the reel 50 could be powered by a power source, such as a traction batter of the vehicle 10 if the vehicle 10 is an electrified vehicle.

The controller 56, in this example, is in communication with a plurality of sensors and uses information from those sensors to set a vertical position of the tailgate 24. In this example, the controller 56 is in communication with two sensors 58, 60 mounted into, or adjacent, the top edge 27 of the tailgate 24 and configured to generate signals indicative of the location and height of various items adjacent a rear of the vehicle 10. The controller 56 is also in communication with a third sensor 62 which is mounted into a rear surface 35 of the tailgate 24 and is configured to generate signals indicative of the relative spacing between the tailgate 24 and a ground surface G. While three sensors 58, 60, 62 are shown herein, this disclosure extends to vehicles 10 with a different number of sensors.

In one aspect of this disclosure, the controller 56 uses information from the sensors 58, 60, 62 to generate commands and cause the actuator assembly 48 to raise and lower the tailgate 24.

Figure 4:
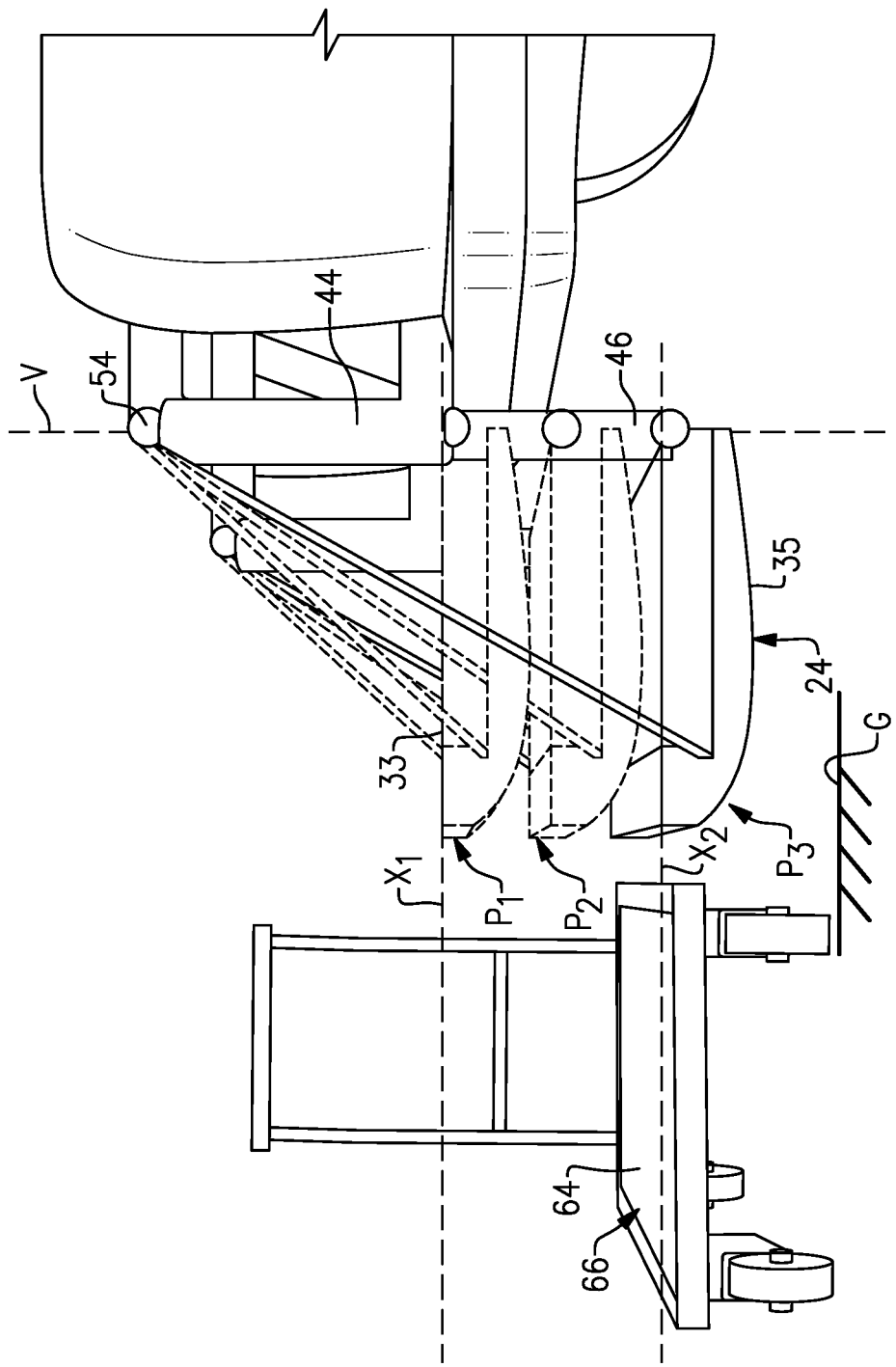
FIG. 4 illustrates additional detail of the lift assembly, and in particular is representative of a tailgate of the vehicle moving vertically between various positions.

In one example method of use, when the tailgate 24 is in the open position and in the extended position, as shown in FIG. 2 and at position $P_1$ in FIG. 4, the tailgate 24 is capable of lowering relative to the ground surface G. In position $P_1$, front surface 33 of the tailgate 24 lies in a first plane $X_1$ substantially parallel to the ground surface G. The first plane $X_1$, in this example, contains the floor 16 of the cargo bed 14. Position $P_1$ is representative of the highest possible position, or upper travel limit, of the tailgate 24.

In response to a command from a user, for example, the controller 56 is configured to command the reel 50 to unwind the cable 52 to gradually lower the tailgate 24. As the tailgate 24 moves, the front surface 33 does not tilt about the axis R and instead remains in a plane parallel to the first plane $X_1$ during vertical movement of the tailgate 24. As the cable 52 unwinds, the tailgate 24 lowers, which increases the effective length of the cable 52 between the pulley 54 and the point at which the cable 52 is fixedly attached to the tailgate 24. Further, the inner housing 46 moves vertically downward along axis V relative to the outer housing 44.

In this example, the controller 56 uses information from the sensors 58, 60, 62 to move the tailgate 24 from the first position $P_1$, to an second position $P_2$ in which the tailgate 24 is closer to a ground surface G than in the first position $P_1$, and ultimately to a third position $P_3$ in which the tailgate 24 is even further to the ground surface G than in the second position $P_2$. Further, in the third position $P_3$, the front surface 33 of the tailgate 24 lies in a second plane $X_2$ which is parallel to the ground surface G and parallel to the first plane $X_1$.

While three positions $P_1$-$P_3$ are shown, it should be understood that the tailgate 24 is moveable to a different number of positions. In a particular example, the tailgate 24 is considered infinitely adjustable between its upper and lower travel limits.

The second plane $X_2$ contains an upper surface 64 of a cart 66 holding the load L. The load L is not shown in FIG. 4 for ease of reference. Position $P_3$ is representative of the lowest possible position, or lower travel limit, of the tailgate 24.

Position $P_3$ may also be referred to as a loading position or an unloading position because positioning the tailgate 24 in position $P_3$ facilitates movement of the load L from the cart 66 to the tailgate 24, or vice versa. When loading the tailgate 24, after transferring the load L to the front surface 33, the tailgate 24 can then be raised, by the controller 56 commanding the reel 50 to wind the cable 52 in, which in turn raises the tailgate 24 back to the first position $P_1$, at which point the load L can be readily placed into the cargo bed 14. The tailgate 24 can then be moved back from the extended position to the standard position, and rotated back to the closed position of FIG. 1.

In this example, the controller 56 is able to locate and determine the location of the upper surface 64 based on feedback from the sensors 58, 60. The controller 56 uses the information from the sensors 58, 60 to position the tailgate 24 in the third position $P_3$. The controller 56 is also able to determine that, in the third position $P_3$, the rear surface 35 of the tailgate 24 will not directly contact the ground surface G, thereby preventing cosmetic blemishes to the tailgate 24. In an aspect of this disclosure, if positioning the tailgate 24 in the third position $P_3$ would cause the tailgate 24 to directly contact the ground surface G, the controller 56 commands the reel 50 such that the tailgate 24 is prevented from reaching the third position $P_3$. Instead, the controller 56 will command the reel 50 to lower the tailgate 24 to a position in which the front surface 33 is close to alignment with the upper surface 64 of the cart 66 yet the tailgate 24 is not in direct contact with the ground surface G. In this way, the controller 56 facilitates loading while also preventing direct contact with the ground surface G.

The tailgate 24 may be useable in one or more modes. In an automatic use mode, the controller 56 may be able to automatically move the tailgate 24 to align the front surface 33 with an upper surface 64 of a cart 66. In a manual use mode, a user would manually raise and lower the tailgate 24. In either mode, the controller 56 prevents movement of the tailgate 24 that would bring the tailgate 24 in direct contact with a ground surface G or other impediment, in order to prevent undesired contact with the tailgate 24, which again may cause cosmetic blemishes to the tailgate.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a panel;
an actuator assembly configured to raise and lower the panel between a highest position and a lowest position, wherein, when the panel is in the lowest position, an underside of the panel is spaced-apart above a ground surface;
a first sensor configured to generate signals indicative of a position of the panel relative to a ground surface;
a controller configured to interpret the signals from the first sensor, and wherein the controller is configured to command the actuator assembly to prevent the panel from being lowered into a position in which the panel would directly contact the ground surface; and
a second sensor configured to generate signals indicative of a position of a cart adjacent the motor vehicle,
wherein the controller is configured to interpret the signals from the second sensor to identify an upper surface of the cart, and wherein the controller is configured to command the actuator assembly to lower the panel into a loading position in which an upper surface of the panel is coplanar with the upper surface of the cart.

2. The motor vehicle as recited in claim 1, wherein, if movement of the panel into the loading position would cause the underside of the panel to directly contact the ground surface, the controller is configured to command the actuator assembly to move the panel to another position in which the panel is adjacent the loading position but the underside of the panel does not directly contact the ground surface.

3. The motor vehicle as recited in claim 1, wherein the panel includes the first and second sensors.

4. The motor vehicle as recited in claim 3, wherein the panel is a tailgate.

5. The motor vehicle as recited in claim 1, wherein, when the panel is in the highest position, an upper surface of the panel is substantially coplanar with a floor of a cargo area of the motor vehicle.

6. The motor vehicle as recited in claim 1, wherein the panel is a tailgate rotatable about an axis between an open position and a closed position relative to a cargo area, and further comprising:
a cable, wherein an end of the cable is fixedly connected to the tailgate adjacent a top of the tailgate; and
a telescopic assembly connected to the tailgate adjacent the axis.

7. The motor vehicle as recited in claim 6, further comprising:
a pulley adjacent a top of the telescopic assembly, wherein the pulley guides the cable.

8. The motor vehicle as recited in claim 7, wherein:
a portion of the telescopic assembly is moveable with the tailgate while the tailgate moves between the highest and lowest positions, and
the pulley is configured to maintain a constant vertical position while the tailgate moves between the highest and lowest positions.

9. The motor vehicle as recited in claim 8, wherein a motorized reel is configured to selectively reel the cable in and out to raise and lower the tailgate, respectively.

10. The motor vehicle as recited in claim 1, wherein the motor vehicle is a pickup truck.

11. A motor vehicle, comprising:
a panel; and
an actuator assembly configured to raise and lower the panel between a highest position and a lowest position, wherein, when the panel is in the lowest position, an underside of the panel is spaced-apart above a ground surface,
wherein the panel is a tailgate rotatable about an axis between an open position and a closed position relative to a cargo area,
wherein, when the tailgate is in the closed position, the tailgate encloses the cargo area from a rear thereof,
wherein, when the tailgate is in the open position, the cargo area is accessible from the rear,
wherein the tailgate is slidable between a standard position and an extended position in a direction parallel to a centerline axis of the motor vehicle,
wherein, in the extended position, a bottom edge of the tailgate is spaced-apart rearward of a rear bumper of the motor vehicle,
wherein the tailgate is only moveable between the highest and lowest positions when the tailgate is in the open position and in the extended position,
wherein the bottom edge of the tailgate is the bottom-most edge of the tailgate when the tailgate is in the closed position and the standard position.

12. The motor vehicle as recited in claim 11, wherein the tailgate is configured to rotate about 90° about a rotational axis perpendicular to a centerline axis of the motor vehicle when moving between the open and closed positions.

* * * * *